United States Patent
Fukami

(10) Patent No.: US 9,581,134 B2
(45) Date of Patent: Feb. 28, 2017

(54) WIND TURBINE BLADE AND MANUFACTURING METHOD THEREOF

(71) Applicant: Mitsubishi Heavy Industries, Ltd., Tokyo (JP)

(72) Inventor: Koji Fukami, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 529 days.

(21) Appl. No.: 14/142,926

(22) Filed: Dec. 30, 2013

(65) Prior Publication Data

US 2014/0234113 A1    Aug. 21, 2014

Related U.S. Application Data

(63) Continuation of application No. PCT/JP2013/053859, filed on Feb. 18, 2013.

(51) Int. Cl.
   *F02D 1/06* (2006.01)
   *F03D 1/06* (2006.01)

(52) U.S. Cl.
   CPC ........ *F03D 1/0675* (2013.01); *F05B 2230/80* (2013.01); *F05B 2240/302* (2013.01); *Y02E 10/721* (2013.01); *Y02P 70/523* (2015.11); *Y10T 29/49337* (2015.01)

(58) Field of Classification Search
   CPC .... F03D 1/0633; F03D 1/0641; F03D 1/0675; F03D 1/0683; F03D 1/0608; F03D 1/065; F03D 1/06
   See application file for complete search history.

(56) References Cited

U.S. PATENT DOCUMENTS

| | | | |
|---|---|---|---|
| 9,140,235 B2* | 9/2015 | Vossler | B29C 33/308 |
| 2009/0169390 A1 | 7/2009 | Nies | |
| 2010/0196159 A1 | 8/2010 | Dawson et al. | |
| 2011/0293432 A1* | 12/2011 | Hibbard | F03D 1/001 416/223 R |

(Continued)

FOREIGN PATENT DOCUMENTS

| | | |
|---|---|---|
| EP | 2365212 A1 | 9/2011 |
| EP | 2416005 A1 | 2/2012 |

(Continued)

OTHER PUBLICATIONS

English Translation of Written Opinion mailed May 11, 2015, corresponding to International application No. PCT/JP2013/053859.

(Continued)

*Primary Examiner* — Richard Edgar
(74) *Attorney, Agent, or Firm* — Kanesaka Berner and Partners LLP

(57) ABSTRACT

A manufacturing method of a wind turbine generator includes a cutting step of cutting a base blade at m cutting planes into (m+1) sections where m is an even number, the m cutting planes being at different positions in a blade length direction; and joining step of joining (m/2+1) sections of the (m+1) sections together to obtain a wind turbine blade which is shorter than the base blade, the (m/2+1) sections including a blade-root section which is closest to a blade root and a blade-tip section which is closest to a blade tip, the blade-root and blade-tip sections being non-adjacent to each other.

8 Claims, 7 Drawing Sheets

(56) References Cited

U.S. PATENT DOCUMENTS

2013/0224032 A1* 8/2013 Busbey ................ F03D 1/0633
　　　　　　　　　　　　　　　　　　　　　416/223 R

FOREIGN PATENT DOCUMENTS

| EP | 2444657 A1 | 4/2012 |
| EP | 2497942 A1 | 9/2012 |
| JP | 200411616 A | 1/2004 |
| JP | 2009536704 A | 10/2009 |
| JP | 2009287514 A | 12/2009 |
| JP | 2012180770 A | 9/2012 |
| WO | 2009101226 A1 | 8/2009 |
| WO | 2012/093136 A2 | 7/2012 |
| WO | 2013/021236 A1 | 2/2013 |

OTHER PUBLICATIONS

Extended European Search Report dated Jul. 7, 2015, corresponding to European patent application No. 13875267.0.
International Search Report and Written Opinion mailed May 14, 2013, corresponds to PCT/JP2013/053859.
International Preliminary Report on Patentability mailed Aug. 27, 2015, corresponding to International Patent Application No. PCT/JP2013/053859.
Decision to grant in JP Application No. 2015-500078, mailed Jul. 29, 2016.
Decision to grant a patent in EP application No. 13875267.0, mailed Sep. 15, 2016.

* cited by examiner

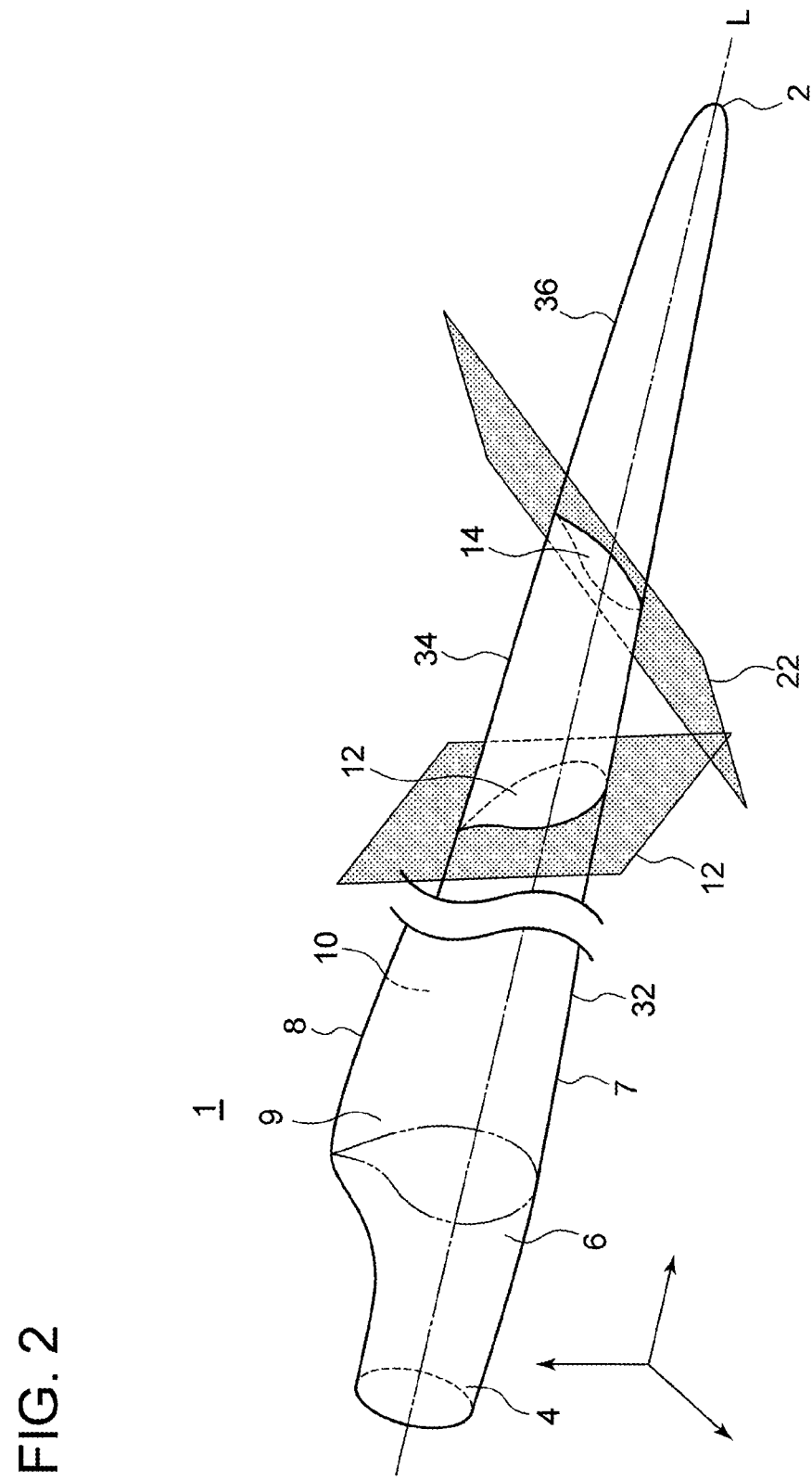

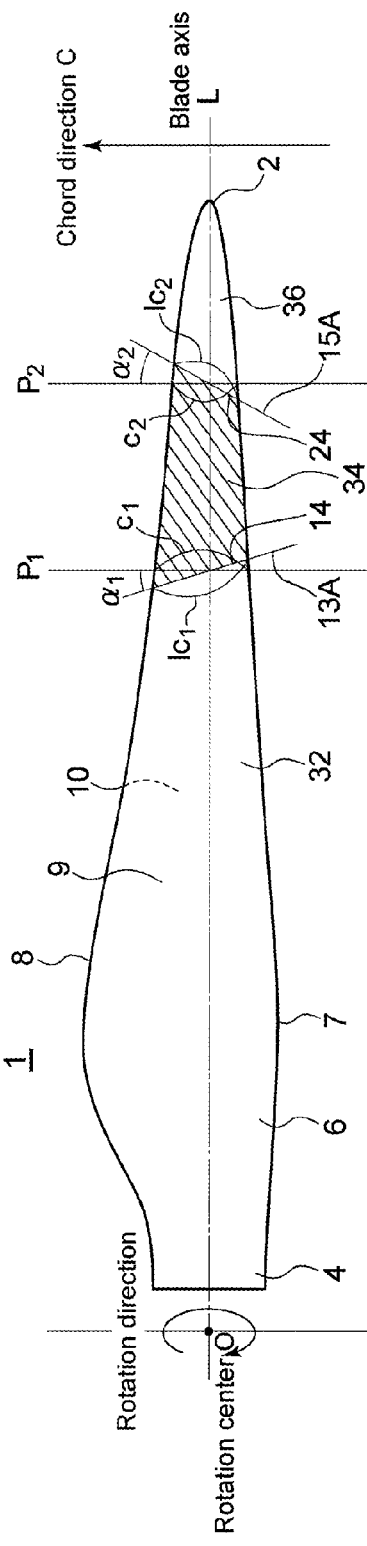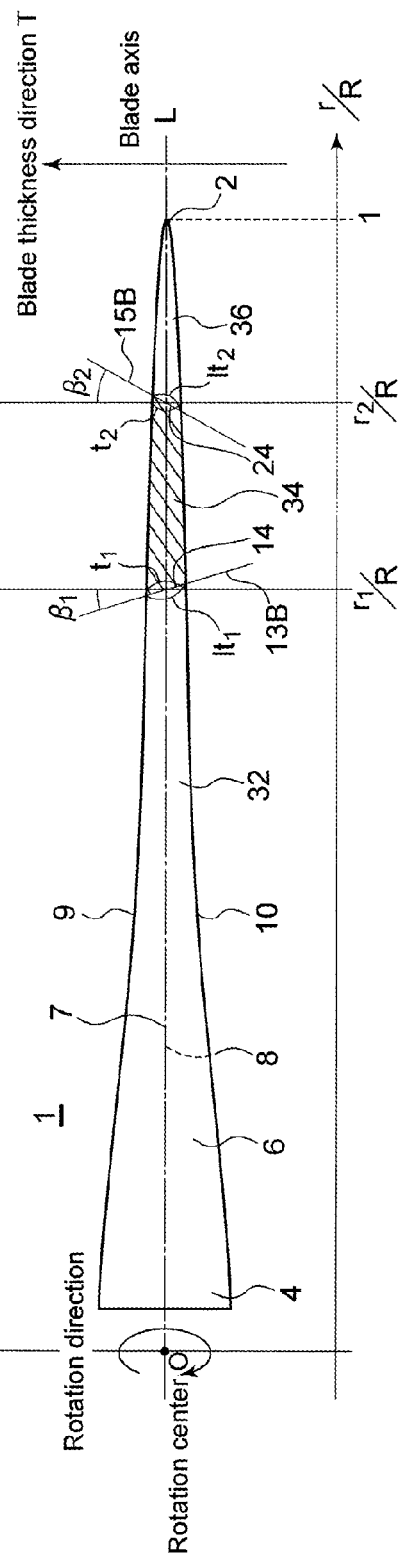
FIG. 3A
FIG. 3B

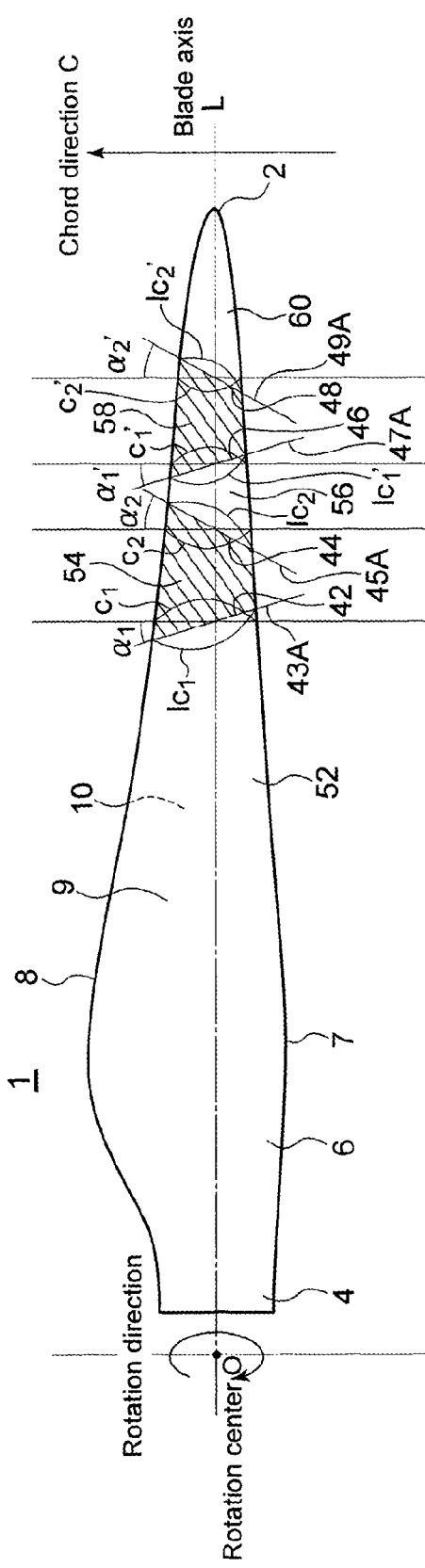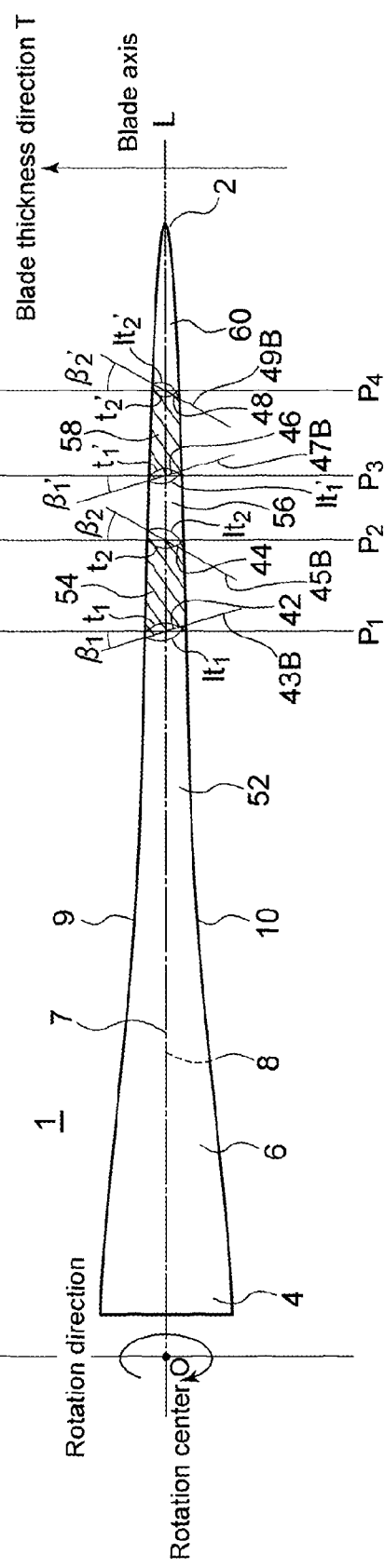
FIG. 6A
FIG. 6B

WIND TURBINE BLADE AND MANUFACTURING METHOD THEREOF

RELATED APPLICATIONS

The present application is a Continuation of International Application Number PCT/JP2013/053859, filed Feb. 18, 2013, which is incorporated herein by reference in its entirety.

TECHNICAL FIELD

The present disclosure relates to a wind turbine blade used for a wind turbine generator and a method for manufacturing the wind turbine blade.

BACKGROUND ART

In recent years, wind turbine generators which generate electric power using wind are becoming popular from the perspective of preserving the global environment. Generally, a wind turbine generator is configured to convert kinetic energy of wind into rotational energy of a wind turbine blade (i.e. the entire rotor including the wind turbine blade) and then to convert the rotational energy into electric power in a generator.

Generally, wind turbine blades are manufactured using a mold to obtain a desired aerofoil profile. As one example of typical manufacturing methods of wind turbine blades, Patent Literature 1 describes a manufacturing method in which a dry fiber sheet disposed on a mold is impregnated with resin and then the resin is hardened to produce a wind turbine blade. In this type of manufacturing method, normally only one type of wind turbine blade which fits the shape of the mold can be manufacture and it requires one mold for each aerofoil profile.

Further, it is proposed in Patent Literature 2 and Patent Literature 3 to retrofit the wind turbine blade by connecting an extension unit to a tip of the existing wind turbine blade to adjust performance of the wind turbine blade according to environment conditions.

CITATION LIST

Patent Literature

[PTL 1]
JP2009-287514 A
[PTL 2]
EP 2365212 A
[PTL 3]
EP 2444657 A

SUMMARY

Technical Problem

The inventors of the present invention engaged in study regarding wind turbine blades came to realize that it was useful to reduce the wind turbine blade in length in many situations through blade length adjustment.

For instance, in existing wind turbine generators, there are many wind turbine generators forced to shut down operation due to lightning strike on a wind turbine blade or other reasons or wind turbine generators operating in the state that the performance is reduced drastically by damages on the blade caused by erosion or other aging deterioration. Once the blade of the wind turbine generator is replaced, the power generation is recovered. However, in the case where the wind turbine generator is an older model, a blade manufacturer may already have discarded equipments (molds) for manufacturing old blades. In this case, it is difficult to reproduce the actual old blade. Further, with increasing size of the wind turbine generators in recent years, the old wind turbine blade having short blade length is normally not replaceable by a large-size blade of a current model. Therefore, it is considered to use the large-scale blade of the current-model wind turbine blade, which is relatively easy to obtain, for the old-model wind turbine generator by adjusting the length of the large-scale blade to obtain a shorter blade.

In the case where wind turbine blades for a variety of wind turbine generators are manufactured using one mold, the technique for shortening the wind turbine blade by adjusting the blade length of the wind turbine blade is advantageous.

However, the technique for adjusting the blade length is not disclosed in Patent Literature 1. In Patent Literature 2 and Patent Literature 3, it is described to extend the length of the blade by adding the extension unit and there is no disclosure regarding the method of shortening the length of the long wind turbine blade.

It is an object of at least one embodiment of the present invention to provide a method for manufacturing a wind turbine blade of a desired length from a long base blade and also to provide a wind turbine blade that is manufactured by the manufacturing method.

Solution to Problem

A manufacturing method of a wind turbine according to at least one embodiment of the present invention comprises:

a cutting step of cutting a base blade at m cutting planes into (m+1) sections where m is an even number, the m cutting planes being at different positions in a blade length direction; and a joining step of joining (m/2+1) sections of the (m+1) sections together to obtain a wind turbine blade which is shorter than the base blade, the (m/2+1) sections including a blade-root section which is closest to a blade root and a blade-tip section which is closest to a blade tip, the blade-root and blade-tip sections being non-adjacent to each other.

The above manufacturing method of the wind turbine blade is advantageous in various situations as it is possible to obtain a wind turbine blade of a desired length shorter than the base blade.

For instance, according to the above manufacturing method of the wind turbine blade, wind turbine blades of various lengths can be manufactured from the mold for the base blade and it is no longer necessary to prepare a mold for each type of wind turbine generator. This lowers the production cost. Further, it is possible to obtain a wind turbine blade for an old-model wind turbine generator from a large blade of a current-model wind turbine generator as the base blade. Thus, even if the wind turbine blade for the old-model wind turbine generator is unavailable, it is still possible to replace the blade of the old-model wind turbine generator which is forced to stop the operation or suffers performance decline due to damages on the wind turbine blade. Furthermore, wind turbine blades for current-model wind turbine generators are often designed with latest technology to achieve improved performance, noise reduction and load reduction compared to old-model blades and thus, even in the case where the old-model blade is available, the above manufacturing method of the wind turbine blade is still advantageous from the perspective of performance enhancement, noise reduction and load reduction of the wind turbine blade.

In some embodiments, in the cutting step, an angle between a chord direction of the base blade and each of two cutting planes belonging to a pair of the sections to be joined together in the joining step is set so that said two cutting planes have approximately the same length of a width-directional line connecting a leading edge and a trailing edge at each of said two cutting planes.

In the present description, "chord direction" is a direction perpendicular to the blade axis and a direction of the chord connecting the leading edge and the trailing edge of the base blade. Further, "blade axis" is an axis along the blade length direction of the base blade. For instance, the blade axis is defined as a line formed by connecting maximum thickness positions in the blade length direction on a center line of a blade section at each radial position of the base blade (the line formed by connecting midpoints between the suction side face and the pressure side face from the leading edge to the trailing edge).

As a result, continuity at each of the leading edge and the trailing edge can be maintained in the joint face between a pair of the sections to be joined in the joining step. This makes it possible to maintain high aerodynamic performance of the wind turbine blade.

In one embodiment, in the joining step, a first cutting plane of one of the pair of the sections on a blade-root side and a second cutting plane of the other of the pair of the sections on a blade-tip side are joined together, a width-directional line within the first cutting plane is parallel to the chord direction or inclines with respect to the chord direction toward the blade tip side with distance from the trailing edge toward the leading edge, and a width-directional line within the second cutting plane inclines with respect to the chord direction toward to the blade-root side with distance from the trailing edge toward the leading edge.

As described above, the width-directional line of the first cutting plane on the blade root part side is parallel to the chord direction or inclines with respect to the chord direction toward the blade tip side with distance from the trailing edge toward the leading edge. Thus, in the section on the blade root part side having the first cutting plane as an end face, the blade length on the trailing edge side is not greater than the blade length on the leading edge. In contrast, the width-directional line within the second cutting plane on the blade tip part side inclines with respect to the chord direction toward to the blade-root side with distance from the trailing edge toward the leading edge. Thus, in the section on the blade tip part side having the second cutting plane as an end face, the blade length on the trailing edge side is smaller than on the leading edge. Therefore, by joining the section on the blade root part side and the section on the blade tip part side together, it is possible to obtain the wind turbine blade having a sweepback angle in which the section on the blade tip part bends toward the trailing edge with respect to the section on the blade root part side. As a result, impact angles of rain droplets, dust or the like is reduced, thereby improving erosion resistance. Further, as the wind turbine blade has the sweepback angle, it is possible to suppress noise increase and reduce a fatigue load.

In another embodiment, the number m of the cutting planes is an even number of not less than 4, a width-directional line within an $i^{th}$ cutting plane from a blade-root side is parallel to the chord direction or inclines with respect to the chord direction toward a blade-tip side with distance from the trailing edge toward the leading edge where i is an odd number not greater than (m−1), and a width-directional line in a $(i+1)^{th}$ cutting plane from the blade-root side inclines with respect to the chord direction toward the blade root side with distance from the trailing edge toward the leading edge.

As a result, it is possible to obtain the wind turbine blade having a sweepback angle in which the section on the blade tip part side bends toward the trailing edge with respect to the section on the blade root part side. Therefore, benefits such as improved erosion-resistance, noise suppression and fatigue load reduction can be obtained. By providing more than one set of the $i^{th}$ cutting plane and the $(i+1)^{th}$ cutting plane from the blade root part side, it is possible to form each of the leading edge and the trailing edge of the wind turbine blade closer to a smooth curve. This makes it possible to improve the aerodynamic performance of the wind turbine blade.

In some embodiment, in the cutting step, an angle between a blade thickness direction of the base blade and each of two cutting planes belonging to a pair of the sections to be joined together in the joining step is set so that said two cutting planes have approximately the same length of a thickness-directional line connecting a point on a pressure side face and a point on a suction side face of the base blade at a maximum thickness position in each of said two cutting planes.

As a result, continuity at each of the pressure side face and the suction side face can be maintained in the joint face between a pair of the sections to be joined in the joining step. This makes it possible to maintain high aerodynamic performance of the wind turbine blade.

In the present description, "blade thickness direction" is a direction perpendicular to the blade axis and the chord direction and connecting the pressure side face and the suction side face.

In one embodiment, in the joining step, a first cutting plane of one of the pair of the sections on a blade-root side and a second cutting plane of the other of the pair of the sections on a blade-tip side are joined together, a thickness-directional line within the first cutting plane is parallel to the blade thickness direction or inclines with respect to the blade thickness direction toward the blade-tip side with distance from the pressure side face toward the suction side face, and a thickness-directional line within the second cutting plane inclines with respect to the blade thickness direction toward the blade-root side with distance from the pressure side face toward the suction side face.

As described above, the thickness-directional line within the first cutting plane on the blade root part side is parallel to the blade thickness direction or inclines with respect to the blade thickness direction toward the blade-tip side with distance from the pressure side face toward the suction side face. Thus, in the section on the blade root part side having the first cutting plane, the blade length on the pressure side face is not greater than the blade length on the suction side face. In contrast, the thickness-directional line within the second cutting plane inclines with respect to the blade thickness direction toward the blade-root side with distance from the pressure side face toward the suction side face. Thus, in the section on the blade tip part side having the second cutting plane, the blade length on the pressure side face is smaller than on the suction side face. Therefore, by joining the section on the blade root part side and the section on the blade tip part side together, the wind turbine blade in which the section on the blade tip part side bends toward the pressure side face with respect to the section on the blade root part side can be obtained. As a result, the same effects as a winglet can be obtained. More specifically, it is possible to manufacture the wind turbine blade which is not prone to generation of a blade tip vortex and which has high blade efficiency.

In another embodiment, the number m of the cutting planes is an even number of not less than 4, the thickness-directional line within an $i^{th}$ cutting plane from the blade-root side is parallel to the blade thickness direction or inclines with respect to the blade thickness direction toward the blade-tip side with distance from the pressure side face toward a suction side face of the base blade where i is an odd number not greater than (m−1), and the thickness-directional line in a $(i+1)^{th}$ cutting plane from the blade-root side inclines with respect to the blade thickness direction toward the blade root side with distance from the pressure side face toward the suction side face of the base blade.

As a result, it is possible to obtain the wind turbine blade in which the section on the blade tip part side bends toward the pressure side face with respect to the section on the blade root part side, thereby achieving the same effects as the winglet. By providing more than one set of the $i^{th}$ cutting plane and the $(i+1)^{th}$ cutting plane from the blade root part side as described above, it is possible to form each of the pressure side face and the suction side face of the wind turbine blade closer to a smooth curve. This makes it possible to improve the aerodynamic performance of the wind turbine blade.

In some embodiments, the m cutting planes includes: a first cutting plane belonging to one of a pair of the sections to be joined together in the joining step on a blade-root side; and a second cutting plane which belongs to the other of the pair of the sections on a blade-tip side and which is joined to the first cutting plane, and a relationship of $(\cos \beta_1/\cos \alpha_1) \approx (\cos \beta_2/\cos \alpha_2)$ is satisfied when the first cutting plane and the second cutting plane have approximately the same blade thickness ratio, where $\alpha_1$ is an angle between the chord direction and a first width-directional line connecting a leading edge and a trailing edge in the first cutting plane, $\alpha_2$ is an angle between the chord direction and a second width-directional line connecting the leading edge and the trailing edge in the second cutting plane, $\beta_1$ is an angle between the blade thickness direction and a first thickness-directional line connecting a point on a pressure side face and a point on a suction side face of the base blade at a maximum thickness position in the first cutting plane, and $\beta_2$ is an angle between the blade thickness direction and a second thickness-directional line connecting a point on the pressure side face and a point on the suction side face at a maximum thickness position in the second cutting plane.

As a result, continuity of the wind turbine blade can be maintained. This makes it possible to further improve the aerodynamic performance of the wind turbine blade.

A wind turbine blade according to at least one embodiment of the present invention comprises:

(m/2+1) sections of (m+1) sections obtained by cutting a base blade in m cutting planes being at different positions in a blade length direction where in is an even number, said (m/2+1) sections being non-adjacent to each other and including a blade-root section which is closest to a blade tip and a blade-tip section which is closest to a blade tip.

The above-described wind turbine blade is advantageous in various situations as the wind turbine blade has the desired length which is shorter than the base blade.

In some embodiments, adjacent two of the sections to be joined have joint faces of approximately the same shape.

As a result, the continuity of the wind turbine blade is maintained and the aerodynamic performance of the wind turbine blade is further enhanced.

A wind turbine generator according to at least one embodiment of the present invention comprises:

a wind turbine blade; and a generator configured to be driven by rotation of the wind turbine blade, and the wind turbine blade includes a blade-root section which is closest to a blade tip and a blade-tip section which is closest to a blade tip from (m+1) sections obtained by cutting a base blade in m cutting planes being at different positions in a blade length direction where m is an even number, and (m/2+1) sections that are non-adjacent to each other are joined together.

The above-described wind turbine generator is advantageous in various situations as it has the wind turbine blade of the desired length which is shorter than the base blade.

Advantageous Effects

According to at least one embodiment of the present invention, it is possible to obtain the wind turbine blade of a desired length which is shorter than the base blade. This is advantageous in various situations.

For instance, it is no longer necessary to prepare a blade-manufacturing mold for each type of wind turbine generators and it is possible to lower the production cost of the wind turbine blade. Further, it is possible to obtain a wind turbine blade for an old-model wind turbine generator from a large blade of a current-model wind turbine generator as the base blade. Thus, it is still possible to replace the blade of the old-model wind turbine generator even if the wind turbine blade for the old-model wind turbine generator is unavailable. Further, even in the case where the old-model blade is available, it is still advantageous from the perspective of performance enhancement, noise reduction and load reduction of the wind turbine blade that the wind turbine blade of the desired length shorter than the base blade can be obtained.

BRIEF DESCRIPTION OF DRAWINGS

FIG. 2 is an oblique view of a configuration example of a base blade according to one example.

FIG. 3A is a side view of the base blade taken from a pressure side in one embodiment.

FIG. 3B is a plane view of the base blade taken from a trailing edge side in the embodiment.

FIG. 6A is a side view of the base blade taken from the pressure side in another embodiment.

FIG. 6B is a plane view of the base blade taken from the trailing edge side in the embodiment.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

Figure 1:
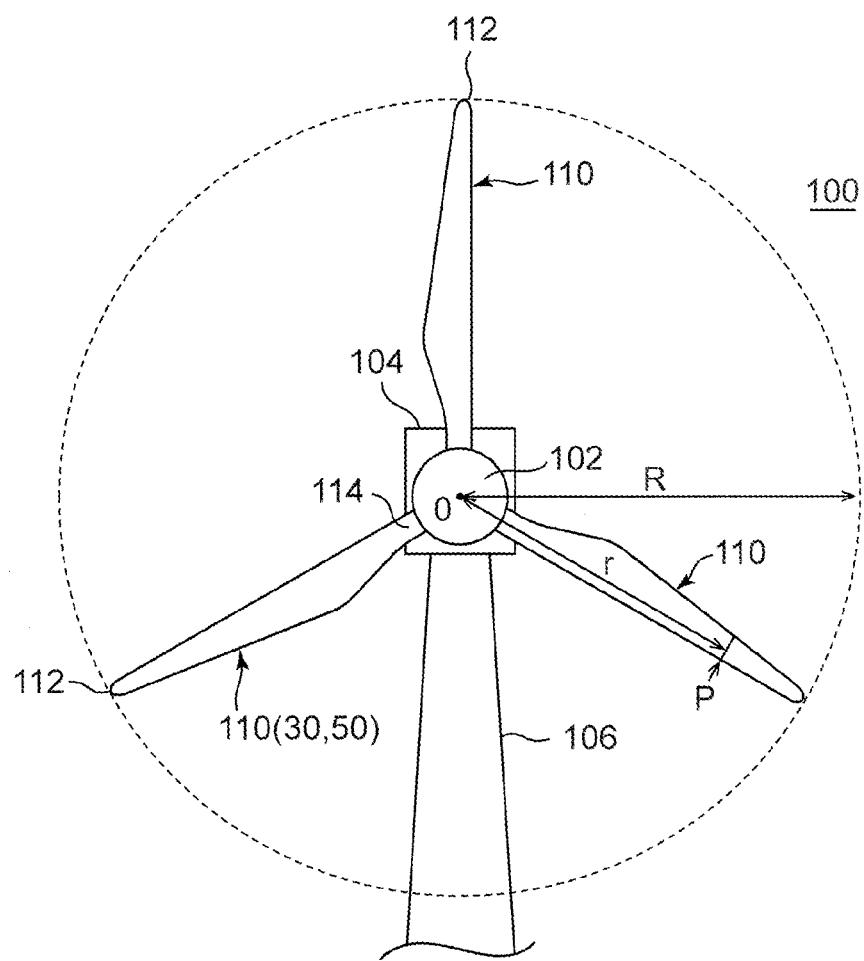
FIG. 1 is an illustration of a configuration example of a wind turbine generator.

The terms used in the present description are explained in reference to FIG. 1. FIG. 1 is an illustration of a configuration example of a wind turbine generator.

A wind turbine generator 100 illustrated in FIG. 1 is provided with at least one wind turbine blade 110 (three blades in this example), a hub 102 to which the wind turbine blade 110 is attached, a nacelle 104 for supporting a rotor including the wind turbine blade 110 and the hub 102, and a tower 106 for supporting the nacelle 104 rotatably. Herein, in some embodiments, the wind turbine blade 110 includes a wind turbine blade 30 (see FIG. 5) and a wind turbine blade 50 (see FIG. 7) which are obtained according to a manufacturing method described later in details. Further, rotation of the rotor is inputted to a generator to generate electric power in the generator.

The wind turbine blade 110 is attached to the hub 102 by fixing a blade root part 114 of the wind turbine blade 110 to the hub 102 with any fastening members.

In the present description, the distance between a rotation center O of the wind turbine blade 110 (i.e. rotation center of the rotor) and a blade tip part 112 is described as a rotation radius R, and the length of the wind turbine blade 110 between the rotation center O and an arbitrary radial position P is described as a radial distance r. Further, definitions of the rotation center O, the rotation radius R and the radius distance r that are explained here also apply to a base blade which is described later in details.

A manufacturing method of a wind turbine blade according to the present embodiment is for manufacturing a wind turbine blade which is shorter in blade length than the base blade.

In some embodiments, the manufacturing method includes: a cutting step of cutting the base blade at m cutting planes being at different positions in a blade length direction to obtain (m+1) sections where m is an even number; and a joining step of joining (m/2+1) sections of the (m+1) sections together to obtain a wind turbine blade which is shorter than the base blade, the (m/2+1) sections including a blade-root section which is closest to a blade tip and a blade-tip section which is closest to a blade tip, the blade-root section and the blade-tip section being non-adjacent to each other, so as to obtain the wind turbine blade shorter than the base blade.

Figure 4A:
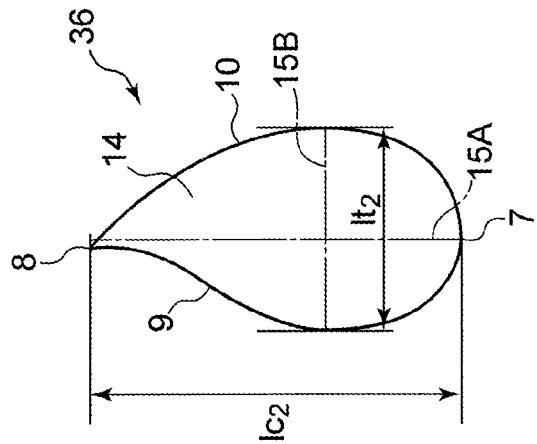
FIG. 4A is an illustration of a first cutting plane in one embodiment.
Figure 4B:
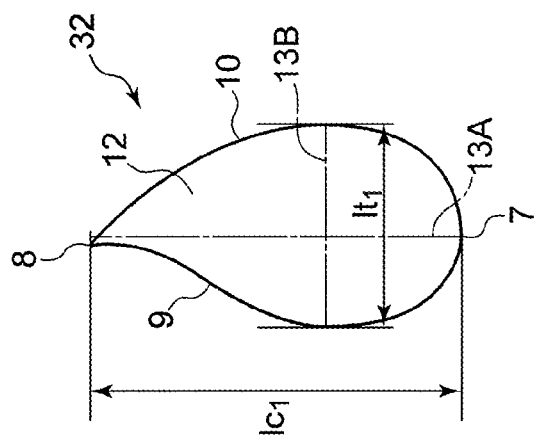
FIG. 4B is an illustration of a second cutting plane in the embodiment.
Figure 5:
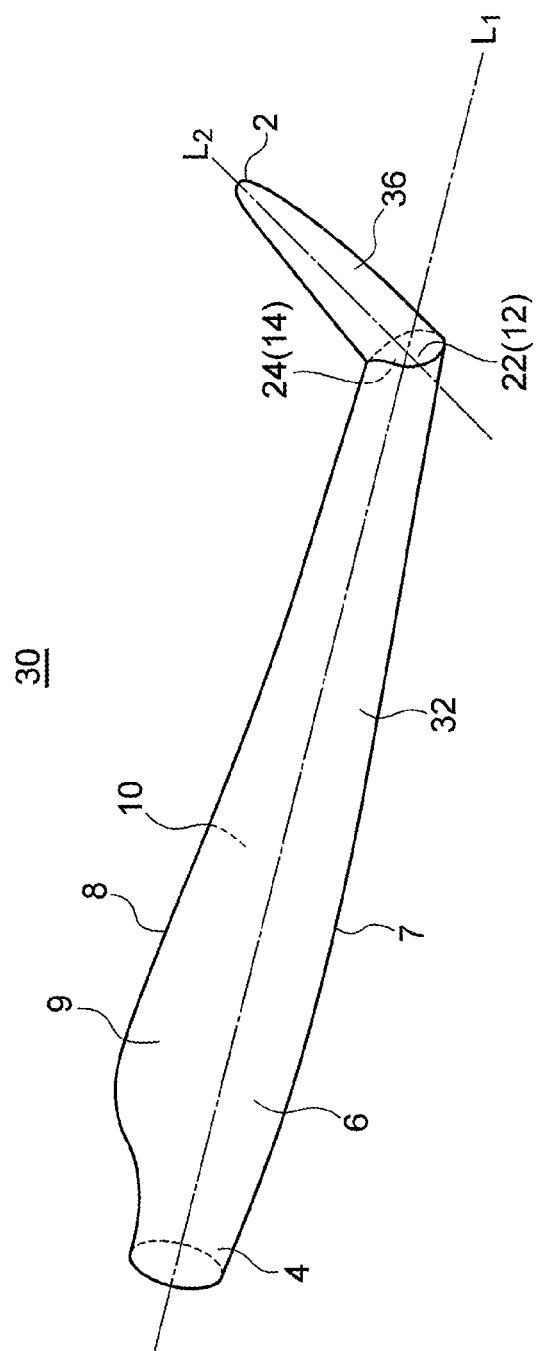
FIG. 5 is an oblique view of a configuration example of a wind turbine blade according to one embodiment.

FIG. 2 is an oblique view of a configuration example of the base blade according to one example. FIG. 3A and FIG. 3B are drawings for illustrating each cutting plane in one embodiment. FIG. 3A is a side view of the base blade taken from a pressure side. FIG. 3B is a plane view of the base blade taken from a trailing edge side. FIG. 4A and FIG. 4B are drawings for illustrating each cutting plane according to one embodiment. FIG. 4A is an illustration of a first cutting plane and FIG. 4B is an illustration of a second cutting plane. FIG. 5 is an oblique view of a configuration example of a wind turbine blade according to one embodiment.

In the embodiments illustrated in FIG. 2 to FIG. 5, the number of the cutting planes is m=2.

The base blade 1 illustrated in FIG. 2 is a blade which is used as a material for manufacturing the wind turbine blade 30 (see FIG. 5) of a desired length.

As illustrated in the drawing, the base blade 1 includes a blade root part 4, a blade tip part 2 and an aerofoil part 6 extending between the blade tip part and the blade root part 4. The aerofoil part 6 has a leading edge 7 and a trailing edge 8. The aerofoil part 6 has a pressure side face 9 and a suction side face 10 extending between the leading edge 7 and the trailing edge 8.

The base blade 1 may be formed using a mold. For instance, the base blade may be formed by impregnating a fiber fabric sheet placed on the mold with resin and then curing the resin. Alternatively, the base blade 1 may be formed by placing on the mold a half-cured prepreg formed of the resin impregnated in the fiber fabric sheet and half-cured to B stage in advance, and then curing the resin of the prepreg.

Further, the base blade 1 may be an existing blade which is longer in blade length than the wind turbine blade 30 to be obtained ultimately.

In this embodiment illustrated in FIG. 2 to FIG. 4, first in the cutting step, the base blade 1 is cut at a first cutting plane 12 and a second cutting plane 14 which are located at different positions in a blade length direction. Herein, the first cutting plane 12 is a cutting plane at a radial position $P_1$ on the blade root part 4 side while the second cutting plane 14 is a cutting plane at a radial position $P_2$ on the blade tip part 2 side. More specifically, the first cutting plane 12 belongs to a section 32 on the blade root part 4 side of a pair of the sections 32 and 36 to be joined together in the joining step described later, while the second cutting plane 14 belongs to the section 36 on the blade tip part 2 side of the two sections 32 and 36. An example of setting the first cutting plane 12 and the second cutting plane 14 in the cutting step is described later.

By cutting the base blade 1 at two places, i.e. the first cutting plane 12 and the second cutting plane 14, three sections can be obtained, including the first section 32, the second section 34 and the third section 36 that are arranged in this order from the blade root part 4 side to the blade tip part 2 side.

Next, in the joining step, the first section 32 being the closest section to the blade root part 4 and the section 36 being the closest section to the blade tip part 2 side are joined together to obtain the wind turbine blade 30 as illustrated in FIG. 5. More specifically, the second section 34 located in the middle among the three sections 32, 34, 36 is removed and the first section 32 on the blade root part 4 side and the third section 36 on the blade tip part 2 side that are not adjacent to each other are joined together to obtain the wind turbine blade 30. In the joining step, the leading edge 7 and the trailing edge 8 of a first joint face 22 (the first cutting plane 12) of the first section 32 may be positioned, respectively, to the leading edge 7 and the trailing edge 8 of a second joint face 24 (the second cutting plane 14) of the third section 36. Similarly, in the joining step, the pressure side face 9 and the suction side face 10 of the first joint face 22 of the first section 32 may be positioned, respectively, to the pressure side face 9 and the suction side face 10 of the second joint face 24 of the third section 36.

The method of joining the sections in the joining step is not particularly limited. For instance, the sections may be joined by boding with a bonding agent, bolt fastening or the like. The wind turbine blade 30 is in the state that the second section 34 is removed from the base blade 1 and thus, the wind turbine blade 30 shorter than the base blade 1 can be obtained.

In reference to FIG. 3A, FIG. 3B, FIG. 4A and FIG. 4B, the example of setting the first cutting plane 12 and the second cutting plane 14 in the cutting step is now explained in details.

In the base blade 1 illustrated in FIG. 3A, "blade axis L" is an axis along the blade length direction of the base blade 1. For instance, the blade axis L is defined as a line formed by connecting maximum thickness positions in the blade length direction on a center line of a blade section at each radial position of the base blade 1 (the line formed by connecting midpoints between the suction side face 10 and the pressure side face 9 from the leading edge 7 to the trailing edge 8). Further, "chord direction C" is a direction perpendicular to the blade axis L and a direction of the chord connecting the leading edge 7 and the trailing edge 8 of the base blade 1. Furthermore, "blade thickness direction T" is a direction perpendicular to the blade axis L and the chord direction C and connecting the pressure side face 9 and the suction side face 10.

In reference to FIG. 3A, FIG. 4A and FIG. 4B, an angle between the chord direction C and each of the cutting planes 12, 14 of the sections 32, 36 to be joined together in the joining step may be set as follows. The angle $\alpha_1$ is formed between the width directional line 13A of the first cutting plane 12 and the chord direction C and the angle $\alpha_2$ is formed between the width directional line 14A of the second cutting plane 14 and the chord direction C. Each of angles $\alpha_1$, $\alpha_2$ may be set so that the length $l_{c1}$ of a width directional line 13A connecting the leading edge 7 and the trailing edge 8 in the first cutting plane 12 is approximately the same as a length $l_{c2}$ of a width directional line 14A connecting the leading edge 7 and the trailing edge 8 in the second cutting plane 14.

More specifically, in the case where the chord length is $c_1$ at the radial position $P_1$ and the chord length is $c_2$ at the radial position $P_2$, the length $l_{c1}$ is approximated by $c_1/\cos \alpha_1$ and the length $l_{c2}$ is approximated by $c_2/\cos \alpha_2$ and thus, the angle $\alpha_1$ and the angle $\alpha_2$ may be set to satisfy relationship (1) described below.

$$(c_1/\cos \alpha_1) \approx (c_2/\cos \alpha_2) \quad (1)$$

As a result, as illustrated in FIG. 5, continuity at each of the leading edge 7 and the trailing edge 8 can be maintained in the first joint face 22 and the second joint face 24 to be joined together in the joining step. This makes it possible to maintain high aerodynamic performance of the wind turbine blade 30. Further, the wind turbine blade 30 may be configured so that the first joint face 22 of the first section 32 and the second joint face 24 of the third section 36 have approximately the same shape.

The first cutting plane 12 belongs to the first section 32 which is on the blade root part 4 side of a pair of the sections 32, 36 to be joined together in the joining step. The width-directional line 13A of the first cutting plane 12 may be parallel to the chord direction C or incline with respect to the chord direction C toward the blade tip part 2 side with distance from the trailing edge 8 toward the leading edge 7. More specifically, the angle $\alpha_1$ between the width-directional line 13A and the chord direction C may be 0° or greater.

In contrast, the second cutting plane 14 belongs to the third section 36 which is on the blade tip part 2 side of the pair of the sections 32, 36 to be joined together in the joining step. The width-directional line 15A of the second cutting plane 14 may incline with respect to the chord direction C toward the blade root part 4 side with distance from the trailing edge 8 toward the leading edge 7. More specifically, the angle $\alpha_2$ between the width-directional line 15A and the chord direction C may be greater than 0°.

In this case, in the case where the chord length monotonously decreases in the blade length direction from the blade root part 4 toward the blade tip part 2, the angle $\alpha_1$ of the first cutting plane 12 may be smaller than the angle $\alpha_2$ of the second cutting plane 14 to satisfy the above relationship (1).

A the width-directional line 13A of the first cutting plane 12 belonging to the first section 32 on the blade root part 4 side is parallel to the chord direction C or inclines with respect to the chord direction C toward the blade tip part 2 side with distance from the trailing edge 8 toward the leading edge 7, the blade length on the trailing edge 8 side is not greater than the blade length on the leading edge 7 side in the first section 32. In contrast, as the width-directional line 15A of the second cutting plane 14 belonging to the third section 36 on the blade tip part 2 side inclines with respect to the chord direction C toward the blade root part 4 side with distance from the trailing edge 8 toward the leading edge 7, the blade length on the trailing edge 8 side is smaller than the blade length on the leading edge 7 side in the third section 36. By joining the first section 32 and the third section 36 together, it is possible to obtain the wind turbine blade 30 having a sweepback angle in which the blade axis $L_2$ of the third section 36 bends toward the trailing edge with respect to the blade axis $L_1$ of the first section 32 as illustrated in FIG. 5. As a result, impact angles of rain droplets, dust or the like is reduced, thereby improving erosion resistance. Further, as the wind turbine blade 30 has a sweepback angle, it is possible to suppress noise increase and reduce a fatigue load.

In reference to FIG. 3B, FIG. 4A and FIG. 4B, an angle between blade thickness direction T and each of the cutting planes 12, 14 of the pair of the sections 32, 36 to be joined together in the joining step may be set as follows. The angle $\beta_1$ is formed between the blade thickness direction T and the thickness-directional line 13B of the first cutting plane 12. The angle $\beta_2$ is formed between the blade thickness direction T and the thickness-directional line 15B of the second cutting plane 14. Each of angles $\beta_1$, $\beta_2$ may be set so that a length $l_{t1}$ of a thickness directional line 13B connecting a point on the pressure side face 9 and a point on the suction side face 10 at the maximum thickness position in the first cutting plane 12 is approximately the same as a length $l_{t2}$ of a thickness directional line 15B connecting a point on the pressure side face 9 and a point on the suction side face 10 at the maximum thickness position in the second cutting plane 14.

More specifically, in the case where the blade thickness is $t_1$ at the radial position $P_1$ and the blade thickness is $t_2$ at the radial position $P_2$, the length $l_{t1}$ is approximated by $t_1/\cos \beta_1$ and the length $l_{t2}$ is approximated by $t_2/\cos \beta_2$ and thus, the angle $\beta_1$ and the angle $\beta_2$ may be set to satisfy relationship (2) described below.

$$(t_1/\cos \beta_1) \approx (t_2/\cos \beta_2) \quad (2)$$

As a result, as illustrated in FIG. 5, continuity at each of the pressure side face 9 and the suction side face 10 can be maintained in the first joint face 22 and the second joint face 24 to be joined together in the joining step. This makes it possible to maintain high aerodynamic performance of the wind turbine blade 30.

The first cutting plane 12 belongs to the first section 32 which is on the blade root part 4 side of a pair of the sections 32, 36 to be joined together in the joining step. The thickness-directional line 13B of the first cutting plane 12 may be parallel to the thickness direction T or incline with respect to the thickness direction T toward the blade tip part 2 side with distance from the pressure side face 9 toward the suction side face 10. More specifically, the angle $\beta_1$ between the first cutting plane 12 and the blade thickness direction T may be 0° or greater.

In contrast, the second cutting plane 14 belongs to the third section 36 which is on the blade tip part 2 side of the pair of the sections 32, 36 to be joined together in the joining step. The thickness-directional line 15B of the second cutting plane 14 may incline with respect to the blade thickness direction T toward the blade root part 4 side with distance from the pressure side face 9 toward the suction side face 10. More specifically, the angle $\beta_2$ between the width-directional line 15A and the chord direction C may be greater than 0°.

As described above, the thickness-directional line 13B of the first cutting plane 12 belonging to the first section 32 on the blade root part 4 side is parallel to the thickness direction T or inclines with respect to the thickness direction T toward the blade tip part 2 side with distance from the pressure side face 9 toward the suction side face 10 and thus, the blade length on the pressure side face 9 is not greater than the blade length on the suction side face 10 in the first section 32. In contrast, the thickness-directional line 15B of the second cutting plane 14 belonging to the third section 36 on the blade tip part 2 side inclines with respect to the blade thickness direction T toward the blade root part 4 side with distance from the pressure side face 9 toward the suction side face 10 and thus, the blade length on the pressure side face 9 is smaller than the blade length on the suction side face 10 in the third section 36. Therefore, the first section 32 and the third section 36 are joined together to obtain the wind turbine blade 30 in which the third section 36 bends toward the suction side face 9 with respect to the first section 32 as illustrated in FIG. 5. As a result, the same effects as a winglet can be obtained. More specifically, it is possible to manufacture the wind turbine blade 30 which is not prone to generation of a blade tip vortex and which has high blade efficiency.

In reference to FIG. 3A, FIG. 3B, FIG. 4A and FIG. 4B, an angle of each of the cutting plane 14, 24 may be set to satisfy the following relationship (3) when the first cutting plane 12 and the second cutting plane 14 have approximately the same blade thickness ratio (=blade thickness/chord length), i.e. $(t_1/c_1) \approx (t_2/c_2)$.

$$(\cos \beta_1/\cos \alpha_1) \approx (\cos \beta_2/\cos \alpha_2) \tag{3}$$

When $\alpha_1 \approx \beta_1$ (including=0), the angle of each of the cutting plane 14, 24 may be set to satisfy $\alpha_2 \approx \beta_2$.

As a result, the continuity of the wind turbine blade is maintained and the aerodynamic performance of the wind turbine blade is further enhanced.

Moreover, the radial position $P_1$ of the first cutting plane 12 may be defined by $0.9 > r_1/R \geq 0.7$ and the radial position $P_2$ of the second cutting plane 14 may be defined by $r_2/R \geq 0.9$. Herein, r is a rotation radius of the base blade 2, $r_1$ is a radial distance at the radial position $P_1$, and $r_2$ is a radial distance at the radial position $P_2$.

By setting the cutting positions $P_1$ and $P_2$ of the base blade 1 in this manner, it is possible to manufacture the wind turbine blade 30 which is capable of suppressing generation of a blade tip vortex and which has high aerodynamic efficiency while maintaining the blade efficiency for converting wind energy into rotational energy of the rotor.

Figure 7:
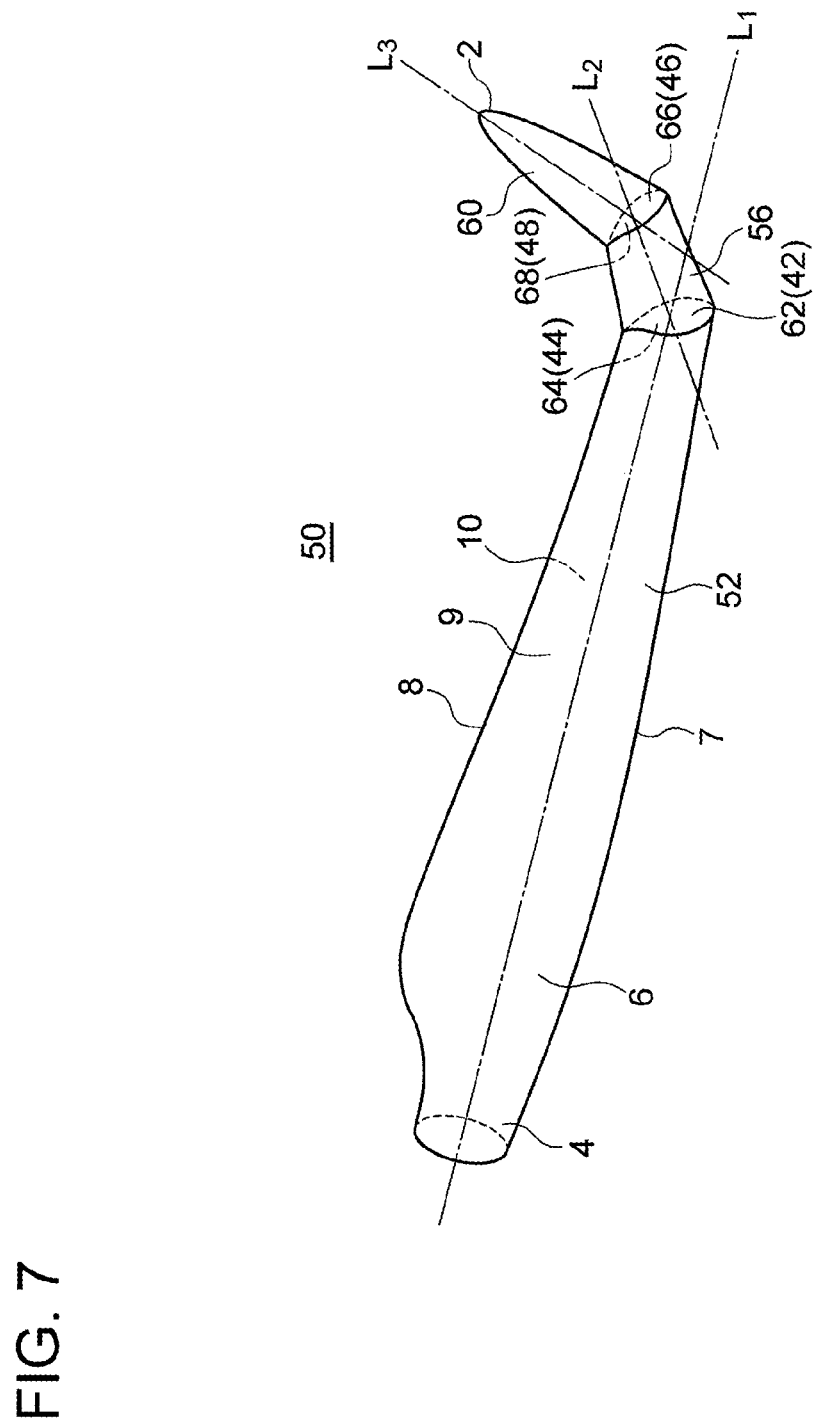
FIG. 7 is an oblique view of a configuration example of the wind turbine blade according to another embodiment.

FIG. 6A and FIG. 6B are drawings for illustrating each cutting plane in another embodiment. FIG. 6A is a side view of the base blade taken from the pressure side. FIG. 6B is a plane view of the base blade taken from the trailing edge side. FIG. 7 is an oblique view of a configuration example of the wind turbine blade according to another embodiment.

In the embodiments illustrated in FIG. 6A, FIG. 6B and FIG. 7, the number of the cutting planes is m=2.

In this another embodiment illustrated in FIG. 6, the base blade 1 is cut, in the cutting step, at four cutting planes (a first cutting plane 42, a second cutting plane 44, a third cutting plane 46 and a fourth cutting plane 48 which are arranged in this order from the blade root part 4 side) that are located at different positions in the blade length direction L. Herein, the first cutting plane 42 is a cutting plane at the radial position $P_1$, the second cutting plane 44 is a cutting plane at the radial position $P_2$, the third cutting plane 46 is a cutting plane at the radial position $P_3$, and the fourth cutting plane 48 is a cutting plane at the radial position $P_4$. The example of setting the first to fourth cutting planes 42, 44, 46, 48 in the cutting step is explained later in details. Further, the configuration of the base blade 1 is substantially the same as that of FIG. 2 and thus is not explained further.

By setting cutting the base blade 1 at four places, i.e. the first to fourth cutting planes 42, 44, 46, 48, the five sections is obtained, including a first section 52, a second section 54, a third section 56, a fourth section 58 and a fifth section 60 in this order from the blade root part 4 side.

Next, in the joining step, three sections including the first section 52 closest to the blade root part 4 and the fifth section 60 closest to the blade tip part 2 and being non-adjacent to one another, are joined together. More specifically, the first section 52 and the third section 56 being non-adjacent to each other are joined together and the third section 56 and the fifth section 60 being non-adjacent to each other are joined together, so as to obtain the wind turbine blade 50 as illustrated in FIG. 7.

In reference to FIG. 6A and FIG. 6B, the example of setting the first to fourth cutting planes 42, 44, 46, 48 in the cutting step is explained in details.

In reference to FIG. 6A, an angle $\alpha_1$ between the chord direction C and a width directional line 43A and an angle $\alpha_2$ between the chord direction C and a width directional line 45A may be each set so that a length $l_{c1}$ of the width directional line 43A of the first cutting plane 42 belonging to the first section 52 is approximately the same as a length $l_{c2}$ of the width directional line 45A of the second cutting plane 44 belonging to the third section 56.

More specifically, in the case where the chord length is $c_1$ at the radial position $P_1$ and the chord length is $c_2$ at the radial position $P_2$, the length $l_{c1}$ is approximated by $c_1/\cos \alpha_1$ and the length $l_{c2}$ is approximated by $c_2/\cos \alpha_2$ and thus, the angle $\alpha_1$ and the angle $\alpha_2$ may be set to satisfy relationship (4) described below.

$$(c_1/\cos \alpha_1) \approx (c_2/\cos \alpha_2) \tag{4}$$

In contrast, an angle $\alpha_1'$ between the chord direction C and a width directional line 47A of the third cutting plane 46 belonging to the third section 56 and an angle $\alpha_2'$ between the chord direction C and a width directional line 49A of the fourth cutting plane 48 belonging to the fifth section 60 may be each set so that a length $l_{c1}'$ of the width directional line 47A of third cutting plane 46 is approximately the same as a length $l_{c2}'$ of the width directional line 49A of the fifth cutting plane 48.

More specifically, in the case where the chord length is $c_1'$ at the radial position $P_3$ and the chord length is $c_2'$ at the radial position $P_4$, the length $l_{c1}'$ is approximated by $c_1'/\cos \alpha_1'$ and the length $l_{c2}'$ is approximated by $c_2'/\cos \alpha_2'$ and thus, the angle $\alpha_1'$ and the angle $\alpha_2'$ may be set to satisfy relationship (5) described below.

$$(c_1'/\cos \alpha_1') \approx (c_2'/\cos \alpha_2') \tag{5}$$

By setting the angles $\alpha_1$, $\alpha_2$, $\alpha_1'$ and $\alpha_1'$ in this manner, as illustrated in FIG. 7, continuity at each of the leading edge 7 and the trailing edge 8 can be maintained in a first joint face 62 and a second joint face 64 to be joined together in the joining step and a third joint face 66 and a fourth joint face 68 to be joined in the joining step. This makes it possible to maintain high aerodynamic performance of the wind turbine blade 30.

In reference to FIG. 6B, an angle $\beta_1$ between blade thickness direction T and the thickness directional line 43B of the first cutting plane 42 belonging to the first section 52 and an angle $\beta_2$ between blade thickness direction T and the thickness directional line 45B of the second cutting plane 44 belonging to the third section 56 may be each set so that a length $l_{t1}$ of the thickness directional line 43B is approximately the same as a length $l_{t2}$ of the thickness directional line 45B.

More specifically, in the case where the blade thickness is $t_1$ at the radial position $P_1$ and the blade thickness is $t_2$ at the radial position $P_2$, the length $l_{t1}$ is approximated by $t_1/\cos\beta_1$ and the length $l_{t2}$ is approximated by $t_2/\cos\beta_2$ and thus, the angle $\beta_1$ and the angle $\beta_2$ may be set to satisfy relationship (6) described below.

$$(t_1/\cos\beta_1) \approx (t_2/\cos\beta_2) \qquad (6)$$

In contrast, an angle $\beta_1'$ between blade thickness direction T and the thickness directional line 47B of the third cutting plane 46 belonging to the third section 56 and an angle $\beta_2'$ between blade thickness direction T and the thickness directional line 49B of the fourth cutting plane 48 belonging to the fifth section 60 may be each set so that a length $l_{t1}'$ of the thickness directional line 47B is approximately the same as a length $l_{t2}'$ of the thickness directional line 49B.

More specifically, in the case where the blade thickness is $t_1'$ at the radial position $P_3$ and the blade thickness is $t_2'$ at the radial position $P_4$, the length $l_{t1}'$ is approximated by $t_1'/\cos\beta_1'$ and the length $l_{t2}'$ is approximated by $t_2'/\cos\beta_2'$ and thus, the angle $\beta_1'$ and the angle $\beta_2'$ may be set to satisfy relationship (7) described below.

$$(t_1'/\cos\beta_1') \approx (t_2'/\cos\beta_2') \qquad (7)$$

By setting the angles $\beta_1$, $\beta_2$, $\beta_1'$ and $\beta_1'$ in this manner, as illustrated in FIG. 7, continuity at each of the pressure side face 9 and the suction side face 10 can be maintained in the first joint face 62 and the second joint face 64 to be joined together in the joining step and the third joint face 66 and the fourth joint face 68 to be joined in the joining step. This makes it possible to maintain high aerodynamic performance of the wind turbine blade 50.

In the illustrative embodiments illustrated in FIG. 6A, FIG. 6B and FIG. 7, the number of the cutting planes is m=4. In the case where the number of the cutting planes is an even number of 4 or greater, an inclination angle of the cutting plane with respect to the chord direction C or the blade length direction T may be set as follow.

More specifically, a width-directional line within an $i^{th}$ cutting plane from the blade root part 4 side (the first cutting plane 42 and the third cutting plane 46 in FIG. 6) may be parallel to the chord direction C or incline with respect to the chord thickness C toward the blade tip 2 side with distance from the trailing edge 8 toward the leading edge 7, where i is an odd number not greater than (m−1). More specifically, in FIG. 6, the angles $\alpha_1$, $\alpha_1'$ may be 0° or greater.

In contrast, a width-directional line within an $(i+1)^{th}$ cutting plane from the blade root part 4 side (the second cutting plane 44 and the fourth cutting plane 48 in FIG. 6) may incline with respect to the chord thickness C toward the blade root part 4 side with distance from the trailing edge 8 toward the leading edge 7. More specifically, in FIG. 6, the angles $\alpha_2$, $\alpha_2'$ may be greater than 0°.

As a result, it is possible to obtain the wind turbine blade 50 having a weepback angle, as illustrated in FIG. 7, in which the blade axis $L_2$ of the third section 56 on the blade tip part 2 side bends toward the trailing edge 8 with respect to the blade axis $L_1$ of the first section 52 on the blade root part 4 side and the blade axis $L_3$ of the fifth section 60 on the blade tip part 2 side bends toward the trailing edge 8 with respect to the blade axis $L_2$ of the third section 56 on the blade root part 4 side. Therefore, benefits such as improved erosion-resistance, noise suppression and fatigue load reduction can be obtained. Further, as described above, by providing more than one set of the $i^{th}$ cutting plane and the $(i+1)^{th}$ cutting plane from the blade root part 4 side, it is possible to form each of the leading edge 7 and the trailing edge 8 of the wind turbine blade 50 closer to a smooth curve. This makes it possible to improve the aerodynamic performance of the wind turbine blade 50.

Moreover, as illustrated in FIG. 6B, a thickness-directional line of the $i^{th}$ cutting plane from the blade root part 4 side (the first cutting plane 42 and the third cutting plane 46 in FIG. 6) may be parallel to the blade thickness direction T or incline with respect to the blade thickness direction T toward the blade tip 2 side with distance from the pressure side face 9 toward the suction side face 10, where i is an odd number not greater than (m−1). More specifically, in FIG. 6, the angles $\beta_2$, $\beta_2'$ may be greater than 0°.

As a result, it is possible to obtain the wind turbine blade 50 as illustrated in FIG. 7 in which the blade axis $L_2$ of the third section 56 on the blade tip part 2 side bends toward the pressure side face 9 with respect to the blade axis $L_1$ of the first section 52 on the blade root part 4 side and the blade axis $L_3$ of the fifth section 60 on the blade tip part 2 side bends toward the pressure side face 9 with respect to the blade axis $L_2$ of the third section 56 on the blade root part 4 side. As a result, the same effects as a winglet can be obtained. Further, as described above, by providing more than one set of the $i^{th}$ cutting plane and the $(i+1)^{th}$ cutting plane from the blade root part 4 side, it is possible to form each of the pressure side face 9 and the suction side face 10 of the wind turbine blade 50 closer to a smooth curve. This makes it possible to improve the aerodynamic performance of the wind turbine blade 50.

As described above, according to the above embodiments, the wind turbine blades 30, 50 of a desired length which is shorter than the base blade 1 can be obtained. This is advantageous in various situations.

For instance, it is no longer necessary to prepare a blade-manufacturing mold for each type of wind turbine generators and it is possible to lower the production cost of the wind turbine blades 30, 50. It is possible to obtain the wind turbine blade 30, 50 for an old-model wind turbine generator from a large blade of a current-model wind turbine generator as the base blade 1. Thus, it is still possible to replace the blade of the old-model wind turbine generator even if the wind turbine blade for the old-model wind turbine generator is unavailable. Further, even in the case where the old-model blade is available, it is still advantageous from the perspective of performance enhancement, noise reduction and load reduction of the wind turbine blade that the wind turbine blade 30, 50 of the desired length shorter than the base blade 1 can be obtained from the base blade 1.

While the embodiments of the present invention have been described in details, it is obvious to those skilled in the art that various changes and modifications may be made without departing from the scope of the invention.

In the above embodiments, the case where the number m of the cutting planes in the base blade 1 is 2 or 4 is described. However, the number m of the cutting planes in the cutting step is not particularly restricted as long as m is an even number of not less than 2.

REFERENCE SIGNS LIST

1 Base blade
2 Blade tip part
4 Blade root part
6 Aerofoil part
7 Leading edge
8 Trailing edge
9 Pressure side face
10 Suction side face
12, 42 First cutting plane
22, 62 First joint face
14, 44 Second cutting plane
24, 64 Second joint face
30, 50 Wind turbine blade
32, 52 First section
34, 54 Second section
36, 56 Third section
46 Third cutting plane
48 Fourth cutting plane
58 Fourth section
60 Fifth section
66 Third joint face
68 Fourth joint face

The invention claimed is:

1. A manufacturing method of a wind turbine, the method comprising:
    a cutting step of cutting a base blade at m cutting planes into (m+1) sections where m is an even number, the m cutting planes being at different positions in a blade length direction; and
    a joining step of joining (m/2+1) sections of the (m+1) sections together to obtain a wind turbine blade which is shorter than the base blade, the (m/2+1) sections including a blade-root section which is closest to a blade root and a blade-tip section which is closest to a blade tip, the blade-root and blade-tip sections being non-adjacent to each other.

2. The manufacturing method of the wind turbine according to claim 1,
    wherein, in the cutting step, an angle between a chord direction of the base blade and each of two cutting planes belonging to a pair of the sections to be joined together in the joining step is set so that said two cutting planes have approximately the same length of a width-directional line connecting a leading edge and a trailing edge at each of said two cutting planes.

3. The manufacturing method of the wind turbine according to claim 2,
    wherein, in the joining step, a first cutting plane of one of the pair of the sections on a blade-root side and a second cutting plane of the other of the pair of the sections on a blade-tip side are joined together,
    wherein a width-directional line within the first cutting plane is parallel to the chord direction or inclines with respect to the chord direction toward the blade tip side with distance from the trailing edge toward the leading edge, and
    wherein a width-directional line within the second cutting plane inclines with respect to the chord direction toward to the blade-root side with distance from the trailing edge toward the leading edge.

4. The manufacturing method of the wind turbine according to claim 2,
    wherein the number m of the cutting planes is an even number of not less than 4, a width-directional line within an $i^{th}$ cutting plane from a blade-root side is parallel to the chord direction or inclines with respect to the chord direction toward a blade-tip side with distance from the trailing edge toward the leading edge where i is an odd number not greater than (m−1), and
    wherein a width-directional line in a $(i+1)^{th}$ cutting plane from the blade-root side inclines with respect to the chord direction toward the blade root side with distance from the trailing edge toward the leading edge.

5. The manufacturing method of the wind turbine according to claim 1,
    wherein, in the cutting step, an angle between a blade thickness direction of the base blade and each of two cutting planes belonging to a pair of the sections to be joined together in the joining step is set so that said two cutting planes have approximately the same length of a thickness-directional line connecting a point on a pressure side face and a point on a suction side face of the base blade at a maximum thickness position in each of said two cutting planes.

6. The manufacturing method of the wind turbine according to claim 5,
    wherein, in the joining step, a first cutting plane of one of the pair of the sections on a blade-root side and a second cutting plane of the other of the pair of the sections on a blade-tip side are joined together,
    wherein a thickness-directional line within the first cutting plane is parallel to the blade thickness direction or inclines with respect to the blade thickness direction toward the blade-tip side with distance from the pressure side face toward the suction side face, and
    wherein a thickness-directional line within the second cutting plane inclines with respect to the blade thickness direction toward the blade-root side with distance from the pressure side face toward the suction side face.

7. The manufacturing method of the wind turbine according to claim 5,
    wherein the number m of the cutting planes is an even number of not less than 4, the thickness-directional line within an $i^{th}$ cutting plane from the blade-root side is parallel to the blade thickness direction or inclines with respect to the blade thickness direction toward the blade-tip side with distance from the pressure side face toward a suction side face of the base blade where i is an odd number not greater than (m−1), and
    wherein the thickness-directional line in a $(i+1)^{th}$ cutting plane from the blade-root side inclines with respect to the blade thickness direction toward the blade root side with distance from the pressure side face toward the suction side face of the base blade.

8. The manufacturing method of the wind turbine according to claim 1,
    wherein the m cutting planes includes: a first cutting plane belonging to one of a pair of the sections to be joined together in the joining step on a blade-root side; and a second cutting plane which belongs to the other of the pair of the sections on a blade-tip side and which is joined to the first cutting plane, and wherein a relationship of $(\cos \beta_1/\cos \alpha_1) \approx (\cos \beta_2/\cos \alpha_2)$ is satisfied when the first cutting plane and the second cutting plane have approximately the same blade thickness ratio, where $\alpha_1$ is an angle between the chord direction and a first width-directional line connecting a leading edge and a trailing edge in the first cutting plane, $\alpha_2$ is an angle between the chord direction and a second width-directional line connecting the leading edge and the trailing edge in the second cutting plane, $\beta_1$ is an angle between the blade thickness direction and a first thickness-directional line connecting a point on a pressure side face and a point on a suction side face of the base blade at a maximum thickness position in the first cutting plane, and $\beta_2$ is an angle between the blade thickness direction and a second thickness-directional line connecting a point on the pressure side face and a point on the suction side face at a maximum thickness position in the second cutting plane.

\* \* \* \* \*